Patented Apr. 2, 1940

2,195,950

UNITED STATES PATENT OFFICE 2,195,950

PROCESS FOR MAKING REFRACTORY BODIES AND MATERIALS

Arthur Roland Wood, St. Helens, England, assignor to Pilkington Brothers Limited, Liverpool, England, a company of Great Britain No Drawing. Application September 16, 1936, Serial No. 101,087. In Great Britain September 21, 1935

12 Claims. (Cl. 106—9)

This invention relates to refractory materials and the process of making them, and has for its object improved refractory bodies and an improved process for making them.

A common form of refractory body is made by firing a mixture consisting mainly of alumina and silica or their compounds (with or without the addition of a flux such as felspar), with a grog which is ground refractory material. The resulting body, if fired to a high temperature, consists of crystals of mullite in a glassy matrix, with or without a small proportion of crystals of corundum.

The quality of a refractory body depends on various characteristics, such as its ability to withstand high temperatures without softening, its resistance to crushing, its resistance to attack by fluxes and other molten liquids, and its density. For some purposes certain of these characteristics are of greater importance and for other purposes others are. Thus, while a high softening point is important for most purposes, resistance to crushing is important in blocks which are subjected to load, while resistance to attack by fluxes is most important in blocks used, for instance, in a glass tank.

Now corundum (which is alumina in crystalline form) is known to be a substance which resists attack by fluxes and other molten liquids more than any other substance that has been used. It has, moreover, a very high melting point of over 2200 degrees (temperatures being expressed in degrees centigrade in this specification). A body, if it consists largely of corundum in a small proportion of glassy matrix, possesses the property of corundum of resisting attack by fluxes, etc., to a high degree.

Hitherto, the only way in which bodies consisting largely of corundum have been made is by melting alumina in an electric arc furnace at a very high temperature of about 2300 degrees and allowing the alumina to crystallize as corundum. The cost of such bodies is, however, prohibitive except for a few special purposes.

According to the invention, a body consisting of crystals in a glassy matrix, in which the crystals are substantially only corundum and constitute the greater proportion of the body, is formed at a temperature substantially below the melting point of alumina. The body is formed of a mixture consisting substantially of alumina and silica and/or compounds thereof and a fluorine-containing substance. The firing temperature is below 1770 degrees. The alumina-silica ratio in the mixture is such as to give the desired proportion of corundum in the body after firing and is high enough, and the firing temperature is low enough, and the quantity of the fluorine-containing substance is large enough to ensure substantial absence of mullite crystals in the body after firing. By increasing the alumina-silica ratio in the mixture, the proportion of corundum to glassy matrix can be made as large as desired, so that it is possible to make a body consisting almost entirely of corundum with only sufficient glassy matrix to form a consistent mass.

Thus, for the first time, it is possible to make bodies consisting largely of corundum at a cost which enables them to be used for purposes such as the construction of glass tanks.

By adding a fluorine-containing substance to an alumina-silica mixture, the nature and quantity of the crystalline phase in the resulting body can be controlled. The alumina-silica ratio in the mixture, the nature and quantity of the fluorine-containing substance and the firing temperature are related. Dependent on their relation, the resulting product will consist of one of the following:

(1) A mass of mullite crystals in a glassy matrix.
(2) A mixture of mullite and corundum crystals in a glassy matrix.
(3) A mass of corundum crystals in a glassy matrix, the proportion of glassy matrix being reducible to the minimum necessary; the product then consists almost entirely of corundum.

With so many variables, it is impossible to state the products resulting from all the combinations of the variables. There will therefore be described the products resulting from certain combinations, and then the general effect of varying each of the variables. Further, the combinations will be mentioned giving the best commercial products at present known to applicant.

The general effect of adding a fluoride to a mixture consisting substantially of alumina and silica will be seen from the following description of the products resulting from a series of mixtures with increasing proportions of alumina, when 10% of fluorspar is added, and the mixture fired at 1720 degrees.

Starting with china clay only, in which the alumina-silica ratio is 0.81, the body produced consists of large mullite crystals in a considerable proportion of glassy matrix, and has a softening point of about 1675 degrees. Adding alumina to the china clay in gradually increasing quantity, there is, at first, a progressive increase in the proportion of mullite crystals to glassy matrix and a progressive rise in the softening point. These reach maxima at an alumina-silica ratio of 1.34 when the softening point is 1730 degrees.

When the alumina is still further increased, corundum crystals appear, mixed with the mullite and, with increasing alumina, the proportion of corundum and glassy matrix increases and, as a consequence of the larger proportion of glassy matrix, the softening point becomes lower, until it reaches a minimum of about 1650 degrees at an alumina-silica ratio of about 2.7. About this ratio (which is slightly in excess of the ratio in mullite), the mullite disappears and the body consists of corundum in a considerable proportion of glassy matrix.

By increasing the alumina-silica ratio above this point, the proportion of glassy matrix diminishes and the softening temperature again rises. The alumina-silica ratio can be increased with advantage up to the point at which the proportion of glassy matrix is the minimum required to form a consistent body, giving a body which consists almost entirely of corundum, with softening point over 1730 degrees. Applicant has found that this point is reached when the alumina-silica ratio is about 15.6. Considerations of cost of the raw materials and of ease in manufacture, however, generally make a lower ratio more advantageous commercially.

When the same series of mixtures are fired at 1540 degrees instead of 1720, it is found, contrary to what has been generally found to occur in clay mixtures without a fluoride addition, that the main result of the lower temperature is to increase the proportion of corundum to that of mullite, in mixtures with a small alumina-silica ratio. The mullite, however, disappears, leaving corundum only as a crystalline phase, at approximately the same alumina-silica ratio of 2.7, and the proportion of corundum to glassy matrix can be increased, with rise of softening point, by increasing the alumina-silica ratio further.

It is thus possible, by the addition of 10% of fluorspar to an alumina-silica mixture, to form a refractory body in which the crystalline phase is corundum only, while firing at a comparatively low temperature. Further by increase of the alumina-silica ratio, the body is given a very high softening point, and the proportion of glassy matrix can be reduced to the minimum desired.

If, now, the quantity of fluorspar is reduced to 5%, when the mixture is fired at about 1720 degrees, bodies having very high softening points are produced, but corundum appears first at a much higher alumina-silica ratio of over 3, while the mullite persists even at a ratio of 7.8.

When the mixture is fired at 1500 degrees, however, the mullite disappears at the alumina-silica ratio of about 2.5 and at all higher ratios, the crystalline phase is corundum only.

At the intermediate temperature of 1600 degrees, the mullite persists up to an alumina-silica ratio of about 3.

If the quantity of fluorspar is reduced to 3%, the firing temperature being 1600 degrees, the mullite persists at higher alumina-silica ratios. Increasing the quantity of fluorspar, above 10%, has the disadvantage that the softening point of the body formed is lower.

The effect of substituting the fluorspar by cryolite, as the fluorine containing substance, will now be described. The cryolite may be the natural mineral or the synthetic form of sodium aluminium fluoride.

With 10% of cryolite and with a firing temperature of 1750 degrees, the crystalline phase is mullite only up to an alumina-silica ratio of a little over 1, when the body formed has the very high softening point of about 1760. As the ratio is increased, corundum appears and the softening point falls to a minimum of about 1700 degrees at a ratio of about 1.75, when the mullite disappears. At higher alumina-silica ratios, the crystalline phase is corundum only, and, as the ratio is increased, the softening point again reaches very high temperatures.

When this mixture is fired at about 1500 degrees, corundum appears in greater quantity at about the same alumina-silica ratio, and the mullite disappears at a rather smaller ratio of about 1.6.

Generally, therefore, the effect of cryolite is similar to that of fluorspar in the production of bodies having, as the alumina-silica ratio is increased, first only mullite, with increasing softening point, then mullite and corundum, with falling softening point, and finally only corundum as the crystalline phase, with rising softening point. The second and third stages, however, occur at lower ratios with cryolite and the softening temperatures are higher.

When 20% of lepidolite (containing about 5% of fluorine) is used as a fluorine containing substance, a mixture fired at 1760 degrees produces mullite crystals only up to an alumina-silica ratio of about 2.6 and corundum crystals only, above a ratio of about 4.7. When the mixture is fired at 1600, the corresponding alumina-silica ratios are about 1.9 and 3.6 respectively.

When 10% of sodium silico-fluoride is used, a mixture fired at 1600 degrees produces mullite crystals only up to an alumina-silica ratio of about 1.6, and corundum crystals only above an alumina-silica ratio of about 2.4.

Opal glass may be used as the fluorine-containing substance. A mixture containing 20% of opal glass having 6% of fluorine, fired at 1730 degrees produces mullite crystals only up to an alumina-silica ratio of about 2.2.

A mixture containing 10% of opal glass produces mullite crystals only up to an alumina-silica ratio of 1.6 and corundum crystals only above a ratio of about 3.7, and these points do not differ greatly at firing temperatures of 1600 and 1760 degrees.

Using 10% of magnesium fluoride, mullite disappears from a mixture fired at 1750 degrees at an alumina-silica ratio of about 2.6.

In regard to the fluorine-containing substance, one that is not readily soluble in water should be used, for the reason that, when any of the substance is dissolved in the water which is necessarily used in the mixture, it becomes unevenly distributed in the mixture, during the evaporation of the water in the process of drying. The degree of solubility which is permissible depends on the proportion of water used in the mixture and it cannot therefore be precisely defined. By the phrase "not readily soluble fluorine-containing substance" is meant a substance of which so small a proportion is dissolved in the water used in the mixture that any lack of homogeneity in the body produced, as a result of the dissolved substance, is negligible.

It is preferable, especially when a body consisting almost entirely of corundum is to be made, to employ a fluorine-containing substance which is so volatile at the temperatures used, that most of it disappears from the body by volatilization.

Of the many fluorine-containing substances, which have been tried by applicant, the best which I have found, taking cost into consideration among other factors, is cryolite, and I have found that from 6% to 10% of cryolite is a suitable proportion.

Using commercial raw materials, the best mixture which applicant has found so far is the following:

|  | Per cent |
|---|---|
| Bauxite | 93 |
| Cryolite | 7 | the bauxite used having the analysis:

|  | Per cent |
|---|---|
| $Al_2O_3$ | 82.9 |
| $SiO_2$ | 14.3 |
| $Fe_2O_3$ | 0.5 |
| CaO | 0.1 |
| Alkalis, etc | 2.2 |

The alumina-silica ratio in this mixture is 5.8, giving a body containing about 82% of corundum.

In the above and, generally, in this specification, the quantities stated are calculated on anhydrous material.

Suitable blocks have been made from the above mixture using 30% of the raw materials and 70% of grog made from the same raw materials, with the addition of 7% of water, and firing at 1510–1520 degrees.

Another mixture which produces an even better block, fired at about the same temperature, but at greater cost, is:

|  | Per cent |
|---|---|
| Ball clay | 20 |
| Alumina | 72 |
| Cryolite | 8 | the ball clay used having the analysis:

|  | Per cent |
|---|---|
| $Al_2O_3$ | 42.4 |
| $SiO_2$ | 54.8 |
| $Fe_2O_3$ | 1.5 |
| CaO | 0.2 |
| Alkalis, etc | 1.1 |

The alumina-silica ratio in this mixture is 7.3, giving a body containing about 85% of corundum.

Less pure materials than the bauxite and ball clay above mentioned may be used, but the refractory body produced will be less perfect, more especially if the impurities contain fluxes.

If it is desired to make a body containing only corundum as the crystalline phase in a glassy matrix, having a given percentage of corundum and using a given fluorine-containing substance, the corresponding alumina-silica ratio is calculated, and a mixture is made up having this ratio, with, however, a margin to allow for imperfect mixing, and taking into account any silica that may be introduced by the fluorine-containing substance. If the alumina-silica ratio selected is 5 or over, then, in nearly all cases likely to arise in practice, using a proportion of the fluorine-containing substance and a firing temperature indicated by the examples described above, the body will contain corundum only, as the crystalline phase. If, however, the body be found to contain mullite, either the firing temperature should be reduced or the quantity of fluorine-containing substance should be increased, or both, until mullite disappears from the body and, preferably, to obtain a body with high softening point, the reduction of firing temperature and/or the increase in fluorine-containing substance should be continued beyond the point at which mullite disappears.

Any trials which may be necessary to ascertain the conditions under which mullite disappears may be made by making up very small blocks or cones, dissolving away the glassy matrix in hydrofluoric acid and examining the crystals remaining under the microscope, when any long needle-shaped crystals of mullite may be seen. It may be noted that a few crystals of mullite may be found in a body made from a mixture which, properly, gives corundum only, as a result of imperfect mixing of the materials. Such a body is to be understood to be within the invention.

The main constituents of any mixture to produce a block with corundum only as the crystalline phase, must be, apart from the fluorine-containing substance, alumina and silica or their compounds, but a portion of these materials must be in plastic form otherwise the bodies formed are powdery; bauxite is sufficiently plastic.

The time of firing the mixtures is a factor which cannot be specified, because it depends largely upon the size and shape of the body formed, and on the rate at which the temperature of the furnace employed is raised. It must, therefore be ascertained by trial for any particular size and type of body and for the furnace employed. As a guide, however, it may be stated that the heat energy required to form bodies according to the invention is substantially less than that required to form bodies of good quality without the addition of a fluorine-containing substance.

Bodies made according to the invention may be shaped in the various ways customarily employed in making refractory blocks. They may be made directly from the raw materials, but then the contraction is too great for most purposes. It is preferred to make a grog from a mixture according to the invention, the grog consisting of corundum in a glassy matrix, to grind this grog and then to add a binder consisting approximately of the same raw materials, to form the body of this mixture and then to fire it.

The crystals referred to in this specification as "mullite" are, applicant believes, mullite only. Since, however, sillimanite crystals are not easily distinguishable from mullite crystals, some of the crystals, when these are small, may be sillimanite.

The glassy matrix is generally amorphous but occasionally contains some crystalline matter which is soluble in hydrofluoric acid. Such crystalline matter is useful only in so far as the glassy matrix is useful, in forming a consistent body, and is therefore deemed to be a part of the glassy matrix.

Having described my invention, I declare that what I claim and desire to secure by Letters Patent is:

1. Process of making a refractory body consisting of crystals in a glassy matrix in which the crystals are substantially only corundum, by adding to a mixture consisting substantially of alumina and silica, the alumina when not hydrated being in the form of silicates, a not readily soluble fluorine-containing substance, and firing a body formed of the mixture at a temperature between 1350° and 1770° C., the mixture being partially in plastic form and having an alumina-silica ratio above 3.5.

2. Process of making a refractory body consisting of crystals in a glassy matrix in which the crystals are substantially only corundum, by adding to a mixture consisting substantially of alumina and silica, the alumina when not hydrated being in the form of silicates, at least one of the following fluorine containing substances: fluorspar, cryolite, lepidolite, sodium silica-fluoride, magnesium fluoride, fluoride opal glass, and firing a body formed of the mixture at a temperature between 1350° and 1770° C., the mixture being partially in plastic form and having an alumina-silica ratio above 3.5.

3. Process of making a refractory body consisting of crystals in a glassy matrix, in which the crystals are substantially only corundum, by adding to a mixture consisting substantially of alumina and silica, the alumina when not hydrated being in the form of silicates, at least 5% of cryolite and firing a body formed of the mixture at a temperature between 1350° and 1770° C., the mixture being partially in plastic form and having an alumina-silica ratio above 3.5.

4. Process of making a body consisting of crystals in a glassy matrix in which the crystals are substantially only corundum, by adding to a bauxite in which the alumina-silica ratio is above 3.5 a not readily soluble fluorine-containing substance, and firing a body formed of the mixture at a temperature between 1350° and 1770° C.

5. Process of making a body consisting of crystals in a glassy matrix in which the crystals are substantially only corundum, by adding to a bauxite in which the alumina-silica ratio is above 3.5, at least one of the following fluorine-containing substances: fluorspar, cryolite, lepidolite, sodium silica-fluoride, magnesium fluoride, fluoride opal glass, and firing a body formed of the mixture at a temperature between 1350° and 1770° C.

6. Process of making a body consisting of crystals in a glassy matrix in which the crystals are substantially only corundum, by adding to a bauxite in which the alumina-silica ratio is above 3.5, at least 5% of cryolite and firing a body formed of the mixture at a temperature between 1350° and 1770° C.

7. Process of making a refractory body consisting of crystals in a glassy matrix, in which the crystals are substantially only corundum, by making a grog of a body made in accordance with claim 1 and firing it with a binder made of a mixture in accordance with claim 1, at a temperature between 1350° and 1770° C.

8. Process of making a refractory body consisting of crystals in a glassy matrix, in which the crystals are substantially only corundum, by making a grog of a body made in accordance with claim 2 and firing it with a binder made of a mixture in accordance with claim 2, at a temperature between 1350° and 1770° C.

9. Process of making a refractory body consisting of crystals in a glassy matrix, in which the crystals are substantially only corundum, by making a grog of a body made in accordance with claim 3 and firing it with a binder made of a mixture in accordance with claim 3, at a temperature between 1350° and 1770° C.

10. Process of making a refractory body consisting of crystals in a glassy matrix, in which the crystals are substantially only corundum, by making a grog of a body made in accordance with claim 4 and firing it with a binder made of a mixture in accordance with claim 4, at a temperature between 1350° and 1770° C.

11. Process of making a refractory body consisting of crystals in a glassy matrix, in which the crystals are substantially only corundum, by making a grog of a body made in accordance with claim 5, and firing it with a binder made of a mixture in accordance with claim 5, at a temperature between 1350° and 1770° C.

12. Process of making a refractory body consisting of crystals in a glassy matrix, in which the crystals are substantially only corundum, by making a grog of a body made in accordance with claim 5, and firing it with a binder made of a mixture in accordance with claim 5, at a temperature between 1350° and 1770° C.

ARTHUR ROLAND WOOD.